United States Patent [19]

Dorfman et al.

[11] 4,152,368
[45] * May 1, 1979

[54] UNSATURATED POLYESTER RESINS HAVING IMPROVED FIRE RETARDANCE

[75] Inventors: Edwin Dorfman, Grand Island; Raymond R. Hindersinn, Lewiston; Willis T. Schwartz, Jr., Grand Island, all of N.Y.

[73] Assignee: Hooker Chemicals & Plastics Corp., Niagara Falls, N.Y.

[ * ] Notice: The portion of the term of this patent subsequent to Sep. 28, 1993, has been disclaimed.

[21] Appl. No.: 692,624

[22] Filed: Jun. 3, 1976

Related U.S. Application Data

[63] Continuation-in-part of Ser. No. 490,423, Jul. 22, 1974, abandoned.

[51] Int. Cl.$^2$ ............................................. C08L 67/06
[52] U.S. Cl. ............................. 260/862; 260/47.75 C; 260/45.75 B; 260/45.75 P; 260/863; 260/869; 260/871; 260/872
[58] Field of Search ........ 260/862, 863, 869, 45.75 C, 260/45.75 P, 45.75 B, 40 R

[56] References Cited

U.S. PATENT DOCUMENTS

| | | | |
|---|---|---|---|
| 2,607,756 | 8/1952 | Anderson | 260/873 |
| 3,373,225 | 3/1968 | Degginger | 260/863 |
| 3,536,782 | 10/1970 | Toggweiller | 260/863 |
| 3,697,456 | 10/1972 | Pitts et al. | 260/45.75 C |
| 3,983,185 | 9/1976 | Dorfman et al. | 260/873 |

FOREIGN PATENT DOCUMENTS

| | | |
|---|---|---|
| 643139 | 7/1964 | Belgium. |
| 772773 | 4/1957 | United Kingdom. |
| 1003327 | 9/1965 | United Kingdom. |

*Primary Examiner*—J. Ziegler
*Attorney, Agent, or Firm*—Peter F. Casella; James F. Mudd; David A. Stein

[57] ABSTRACT

Unsaturated polyester resins having improved fire retardant properties comprise a halogen-containing unsaturated polyester of a polycarboxylic compound and a polyhydric alcohol together with an additive mixture comprising iron or a compound of iron and at least one member of the group consisting of copper, a compound of copper, antimony and a compound of antimony. The unsaturated polyester resin may be copolymerized with an unsaturated monomer to prepare castings, laminated products, reinforced articles and the like having low burning rates, low smoke generation, and beneficial char formation in the presence of a flame.

51 Claims, No Drawings

UNSATURATED POLYESTER RESINS HAVING IMPROVED FIRE RETARDANCE

CROSS-REFERENCE TO RELATED APPLICATION

This is a continuation-in-part of copending U.S. application Ser. No. 490,423, filed July 22, 1974, now abandoned.

BACKGROUND OF THE INVENTION

During recent decades, the growth of the plastics industry and an ever-increasing use of polymeric materials has coincided with an increasing awareness and concern for the safety hazards, especially fire hazards of materials. The result has been the development of a variety of fire retardant additives and fire retardant polymeric compositions. In past years, the major emphasis in the development of such fire retardant compositions has been in the achievement of low burning rates. More recently, however, there has been an increasing recognition of the hazards of smoke generation during fire and the advantages of char formation in inhibiting combustion. Furthermore, it is now more generally recognized that low burning rates do not necessarily imply or result in low smoke generation or beneficial char formation. As a result, the need is now recognized for the development of improved fire retardant polymeric systems having not only low burning rates, but low smoke generation and high char formation.

Among the developments in the field of fire retardant polymeric systems in recent years, the development of polymeric systems employing antimony trioxide as a fire retardant additive has been outstanding. Antimony trioxide has been found especially effective for use in systems based on halogen containing polymers. The effectiveness of antimony trioxide, as well as other antimony compounds as a fire retardant additive to halogen containing polymers is generally recognized and has been described as a synergistic effect between antimony and halogen. Despite its generally recognized effectiveness in such systems, the use of antimony trioxide, as well as other antimony compounds, has been found to result in certain disadvantages. For example, although the use of antimony compounds has been shown in many instances to advantageously decrease flammability and burning rate of polymer systems, it appears to provide little advantage in inhibiting formation of smoke and in some instances has been found to increase smoke formation. Furthermore, the use of antimony trioxide system may result in the diminution of other useful and desirable properties of polymer systems. Thus, for example, normally translucent polyester resins have been rendered opaque by the incorporation of sufficient quantities of antimony trioxide to render the resins fire retardant. In addition, in recent years, the rapidly rising cost of antimony compounds has been an economic disadvantage.

As a result of these disadvantages associated with the use of antimony compounds as fire retardant additives, considerable effort has been expended in a search for other fire retardant additives. However, the effectiveness of a particular fire retardant additive in a polymeric system is generally unpredictable and an additive useful in one polymeric system may be ineffective or even harmful when used in a different polymeric system. Even more unpredictable is the effect achieved when fire retardant additives are combined. Combinations of various fire retardant additives may result in a beneficial or detrimental formulation with a given polymeric system. Furthermore, combinations of fire retardant additives may benefit one aspect of fire retardance and be detrimental to another.

It is known from *The Journal of Fire and Flammability*, 51-84, 1972, James J. Pitts, that in some instances at relatively high levels of addition, iron oxides or copper oxides may serve effectively as a partial replacement for antimony oxide in chlorine containing urethane foams. The use of iron or copper oxides in combination or in combination with antimony oxide at lower levels of addition or in other polymer systems is not shown.

It is also known from applicants' copending application Ser. No. 383,749, filed July 30, 1973, now abandoned, continuations-in-part filed as Ser. No. 514,984 issued as U.S. Pat. No. 3,983,185 and as Ser. No. 642,026 issued as U.S. Pat. No. 4,013,815 to employ iron compounds or fire retardant additives in halogen-containing unsaturated polyester resins.

In applicants' copending application Ser. No. 383,747, filed July 30, 1973, now abandoned continuation-in-part filed as Ser. No. 584,447 issued as U.S. Pat. No. 3,922,480 it is disclosed that copper compounds can be advantageously employed as fire retardant additives in halogen containing unsaturated polyester resins. There is no suggestion in either application to combine iron with copper and/or antimony.

Accordingly, it is an object of this invention to provide superior fire retardant unsaturated polyester resins that not only have low burning rates, but also exhibit low smoke generation when in contact with a flame.

It is also an object of the invention to provide superior fire retardant polyester resins that develop a beneficial, insulating layer of char in the presence of a flame which inhibits further combustion of the polymer.

It is still another object of the invention to render unsaturated polyester resins fire retardant without diminishing or deteriorating other useful properties of the polymer system.

These and other objects are accomplished by this invention which is described in detail hereinafter.

SUMMARY OF THE INVENTION

The improved fire retardant polymer compositions of this invention comprise an $\alpha$-, $\beta$-ethylenically unsaturated polyester of a polycarboxylic compound and a polyhydric alcohol, the polyester being copolymerizable with an unsaturated monomer and containing a halogen in a proportion of greater than about 4 weight percent and an effective fire retardant proportion of about 0.2 to about 10 weight percent of an additive mixture comprising at least 0.1 weight percent of iron or a compound of iron and at least 0.1 weight percent of at least one member of the group consisting of copper, a compound of copper, antimony and a compound of antimony, the proportions being based on the weight of unsaturated polyester and unsaturated monomer.

Thus, it will be seen that the present invention relates to compositions containing the aforementioned additive mixture, and in one aspect these compositions comprise a halogen-containing unsaturated polyester, copolymerizable with an unsaturated monomer; in a second aspect, comprise a halogen-containing unsaturated polyester in admixture with a copolymerizable monomer; and in a third aspect, the copolymerized product thereof.

The preferred halogen containing polyesters of the invention are those wherein the halogen is provided by a Diels Alder adduct of a hexahalocyclopentadiene and a polycarboxylic compound or polyhydric alcohol containing aliphatic carbon-to-carbon unsaturation. The preferred adducts are chlorendic acid or chlorendic anhydride.

The additive mixture may contain iron and copper and/or antimony in various forms including various inorganic and organic compounds of each. Based on effectiveness, availability, economic and other considerations, inorganic compounds are preferred. Especially preferred when translucency of the resin is not an objective are the common oxides of iron, copper and antimony. However, various other compounds may be selected depending on the properties desired in the cured product. For example, where it is desired to retain the translucent character of the unsaturated polyester, it is advantageous to employ colorless salts, that is compounds of iron and copper and/or antimony that permit the transmission of light when incorporated in the polyester resin system and to minimize the proportions of opaque compounds such as the oxides and employ various colorless salts. It has been found that up to about one half weight percent of an opaque additive may be employed without an undue loss of translucency.

The unsaturated polyester containing the additive mixture of this invention is copolymerizable with an ethylencially unsaturated monomer, preferably a vinyl or vinylidene monomer, to prepare castings, laminated products, reinforced articles and the like having low burning rates, low smoke generation and beneficial char formation in the presence of a flame.

DESCRIPTION OF EMBODIMENTS

The Polyesters

The unsaturated polyesters useful in the invention are generally those commonly known in the art, and are generally the reaction product of a polycarboxylic compound and a polyhydric alcohol. By polycarboxylic compounds is meant the polycarboxylic acids, polycarboxylic anhydrides, polycarboxylic acid halides, and polycarboxylic acid esters. The unsaturation can be provided in either or both the polycarboxylic compound or the polyhydric alcohol. Suitable unsaturated polycarboxylic acids having aliphatic carbon-to-carbon double bonds, and the corresponding acid halides, esters, and anhydrides can include maleic, fumaric, chloromaleic, ethylmaleic, itaconic, citraconic, xeronic, pyrocinchonic, mesaconic, aconitic and acetylene dicarboxylic, either alone or in mixtures.

Illustrative of the unsaturated polyhydric alcohols having aliphatic carbon-to-carbon double bonds, which can be used in providing the unsaturation in the linear polyester molecules are compounds such as butene diol, pentene diol, the unsaturated hydroxy ethers such as allyl or vinyl glycerol ethers, allyl or vinyl pentaerythritol ethers and the like.

The saturated polycarboxylic compounds useful in the preparation of the polyesters can be aliphatic, cycloaliphatic, aromatic or heterocyclic. Illustrative of these polycarboxylic acids, acid halides, acid anhydrides and acid esters include phthalic, isophthalic, terephthalic, tetrachlorophthalic, tetrabromophthalic, dibromotetrahydrophthalic, chlorendic, adipic, succinic, dichlorosuccinic, and mixtures thereof.

Suitable saturated polyhydric alcohols for use in the preparation of the polyester resins include ethylene glycol, diethylene glycol, propylene glycol, dipropylene glycol, butanediol, pentanediol, hexanediol, dibromoneopentyl glycol, neopentyl glycol, 1,4-cyclohexane dimethanol, glycerol, mannitol, sorbitol, bisphenols, substituted bisphenols, hydrogenated bisphenols and mixtures thereof.

The properties of the polyester resins can be modified by the incorporation of suitable monofunctional carboxylic compounds and alcohols. Illustrative examples of such compounds are 2,2-dichloroethanol; 1,1-dibromo-2-propanol; 2,2,2-tribromoethanol; 1,1,3,3-tetrabrome-2-propanol; 1,1,1-trifluoro-2-propanol and 2,3-dibromo-1-propanol. An example of a carboxylic compound is pentachlorophenoxy acetic acid.

The properties of the polyesters can be varied by using mixtures of the various types of acids and alcohols, such as an unsaturated acid, a saturated acid and a saturated alcohol.

The unsaturated polyester resins of this invention contain greater than about 4 weight percent up to about 50 weight percent or more of halogen based on the weight of the unsaturated polyester resin and copolymerizable unsaturated monomer and preferably about 4 to about 40 weight percent. The foregoing broad and preferred ranges are about 4.4 to about 56 weight percent and about 4.4 to about 45 weight percent, respectively, when the ranges are based on the weight of the unsaturated polyester. The preferred halogenated unsaturated polyesters are those wherein the halogen is chlorine or bromine or a combination thereof. The proportion of halogen is preferably greater than 15 weight percent and even more preferably, greater than 20 weight percent when the halogen is chlorine.

The preferred unsaturated polyesters of the invention contain either an adduct of hexahalocyclopentadiene and a polycarboxylic compound containing aliphatic carbon-to-carbon unsaturation or an adduct of hexahalocyclopentadiene and a polyhydric alcohol containing aliphatic carbon-to-carbon unsaturation. The preferred unsaturated polyesters are the reaction products of a polycarboxylic adduct of hexahalocyclopentadiene, another carboxylic compound containing carbon-to-carbon unsaturation and a polyhydric alcohol. Such a product is disclosed and claimed in U.S. Pat. 2,779,701, issued January 29, 1957 the disclosure of which is herein incorporated by reference. Other methods for incorporating either a polycarboxylic or polyhydric alcohol adduct of hexahalocyclopentadiene include: (1) the reaction of a polycarboxylic adduct of hexahalocyclopentadiene, an unsaturated polyhydric alcohol containing aliphatic carbon-to-carbon unsaturation, disclosed and claimed in U.S. Pat. No. 2,863,794, issued Dec. 9, 1958; (2) the reaction of a polyhydric alcohol adduct of hexahalocyclopentadiene with a polycarboxylic compound containing aliphatic carbon-to-carbon unsaturation disclosed and claimed in U.S. Pat. No. 2,779,700, issued Jan. 29, 1957; and (3) the reaction of a polyhydric alcohol adduct of hexahalocyclopentadiene with another alcohol containing aliphatic carbon-to-carbon unsaturation and a polycarboxylic acid, disclosed and claimed in U.S. Pat. No. 2,863,795, issued Dec. 9, 1958. An alternate method for incorporating an adduct of hexahalocyclopentadiene into a polyester resin involves reacting an unsaturated polyester resin with a copolymerizable compound containing an adduct of hexahalocyclopentadiene, such as disclosed and claimed in U.S. Pat. No. 2,783,215, issued Feb. 26, 1957. The polyester resins containing the polycarboxylic and polyhydric alcohol adducts of hexahalocyclopentadiene can be modified by incorporating therein saturated carboxylic acids and anhydrides, as disclosed and claimed in U.S. Pat. No. 2,890,144, issued June 9, 1959, and U.S. Pat. No. 2,898,256, issued Aug. 4, 1959. When used in this specification, the term polycarboxylic compound refers to the polycarboxylic acids, acid anhydrides, acid halides and acid esters, of either the aliphatic or aromatic type.

Among the adducts of hexahalocyclopentadiene and polycarboxylic compounds which may be used are: 1,4,5,6,7,7-hexachlorobicyclo-(2.2.1)-5-heptene-2,3-dicarboxylic acid and anhydride, also known as chlorendic acid and anhydride; 1,4,5,6,7,7-hexabromobicyclo-(2.2.1)-5-heptene-2,3-dicarboxylic acid; 1,4,5,6,7,7-hexachloro-2-methylbicyclo-(2.2.1)-5-heptene-2,3-dicarboxylic anhydride; 1,4,5,6,7-tetrachloro-7,7-difluorobicyclo-(2.2.1)-5-heptene-2,3-dicarboxylic acid; 1,4,5,6,7,7-hexachlorobicyclo-(2.2.1)-5-heptene-2-acetic-2-carboxylic anhydride; 5,6,7,8,9,9-hexachloro-1,2,4,4,4a,5,8,8a-octahydro-5,8-methano-2,3-naphthalene dicarboxylic acid and anhydride; 1,2,3,4,5,6,7,7-octachloro-3,6-methano-1,2,3,6-tetra-hydrophthalic acid and anhydride; 2,3,-dicarboxy-5,8-endomethylene-5,6,7,8,9,9-hexachloro-1,2,3,4,4a,5,8,8a-octahydronaphthalene anhydride; 2,3-bis(ethylene carboxy)-1,4,5,6,7,7-hexachlorobicyclo(2.2.1)5-heptene; and 1,4,5,6,7,7-hexachlorobicylco-(2.2.1)-5-heptene-2,3-dicarbonyl chloride.

Among the adducts of hexahalocyclopentadiene and polyhydric alcohols which may be used are: 1,4,5,6,7,7-hexachloro-2,3-bis-hydroxymethylbicyclo-(2.2.1)-5-heptene; 1,4,5,6,7,7-hexachloro-2,3-bis-hydroxymethylbicyclo-(2.2.1)-2,5-heptadiene; 3-(1,4,5,6,7,7-hexachlorobicyclo-(2.2.1)-5-heptene-2-yl)-methoxy-1,2-propanediol; 1,4,5,6-tetrachloro-7,7-difluoro-2,3-bis-hydroxymethylbicyclo-(2.2.1)-5-heptene; 1,4,5,6,7,7-hexabromo-2,3,-bis-hydroxy-methylbicyclo-(2.2.1)-5-heptene; 3-(1,4,5,6-tetrachloro-7,7-difluorobicyclo-(2.2.1)-5-heptene-2-yl)-methoxy-1,2-propane diol. These compounds and methods of preparation are disclosed in U.S. Pat. No. 3,007,958, issued Nov. 7, 1961.

It us also within the scope of the invention to use other halogen-containing polyesters such as those derived from tetrachlorophthalic acid or anhydride, and tetrabromophthalic acid or anhydride.

Halogenated polyesters, especially brominated polyesters for use in the invention can be advantageously prepared by the procedure of Toggweiler et al. U.S. Pat. No. 3,536,782. In the latter process, base polyester is prepared by reaction of a polycarboxylic acid reactant comprising at least one alpha, beta ethylenically unsaturated dicarboxylic acid or anhydride containing up to 20 carbon atoms per molecule with at least one compound containing aliphatic unsaturation having a halogenation rate faster than that of the alpha, beta-ethylenically unsaturated dicarboxylic acid or anhydride e.g. polyhydric alcohol containing active unsaturation which is subject to subsequent halogenation or mixtures of at least one polyhydric alcohol with at least one ethylenically unsaturated dicarboxylic acid or anhydride free of alpha, beta ethylenic unsaturation other than aromatic unsaturation, and thereafter is halogenated by reaction with halogen sufficient to produce a halogenated polyester containing 10 to 60 weight percent halogen substituent employing a solvent, such as methylene dichloride, which is not readily susceptible to halogenation and a halogenation temperature of about $-50°$ to $+50°$ C. This technique and the halogenated products thereof (which conveniently may be termed posthalogenated polyesters) are described in greater detail in the aforementioned patent of Toggweiler et al., the pertinent disclosure of which is incorporated herein by reference.

The halogen can be provided in the polyesters of the invention by a combination of the foregoing methods. Thus, an unsaturated polyester can be prepared using a halogenated dibasic acid such as chlorendic acid, and a brominated alcohol such as dibromopropanol.

The polycarboxylic compounds are polyhydric alcohols required in the production of the foregoing halogen-containing adducts and polyesters can be provided by using any of the compounds disclosed hereinbefore.

The temperature for the reaction between polyhydric alcohols and polybasic acids ranges from about one hundred to two hundred degrees Celsius, although higher or lower temperatures can be used. Esterification catalysts such as para-toluene sulfonic acid, benzene sulfonic acid, beta-naphthalene sulfonic acid and the like, can be added to the reaction mixture. The proportion of polyhydric alcohol is approximately controlled by the total mole proportion of acids in the esterification reaction mixture. It is also preferred to react the polyhydric alcohols and polybasic acids in roughly equimolar proportion; however, either the acids or alcohols can be used in substantial excess, if it is desired to form a low molecular weight polyester resin.

Unsaturated Monomers

A variety of ethylenically unsaturated monomers can be used for curing or cross-linking the ethylenically unsaturated polyesters. It is generally preferred that addition polymerization be practiced since no by-product ammonia or water is formed, and the problems resulting therefrom are not experienced. The vinylidene monomers useful in curing the thermoplastic unsaturated polymers include vinylic compounds or mixtures thereof capable of cross-linking ethylenically unsaturated polymer chains at their points of unsaturation. Usually they contain the reactive groups $H_2C=C<$. Specific examples include styrene, chlorostyrenes, methyl styrenes such as alpha methyl styrene, p-methyl styrene, vinyl benzyl chloride, divinyl benzene, indene, unsaturated esters such as: methyl methacrylate, methyl acrylate and other lower aliphatic esters of acrylic and methacrylic acids, allyl acetate, vinyl acetate, diallyl phthalate, diallyl succinate, diallyl adipate, diallyl sebacate, diethylene glycol bis(allyl carbonate), triallyl phosphate and other allyl esters, and vinyl toluene, diallyl chlorendate, diallyl tetrachlorophthalate, ethylene glycol diacrylate, ethylene glycol dimethacrylate, ethylene glycol diethacrylate, and mixtures thereof. The monomer may be admixed in the polymer in an amount sufficient to produce a thermoset polymer and the admixture heated to an elevated temperature in the presence of a suitable catalyst to cross-link or cure the polymer. With proper catalyst systems such as cobalt naphthenate and methylethyl ketone peroxide, room temperature cures are obtained.

The cross-linking agent can be advantageously combined with the polymerizable polyester while the unsaturated polyester and the olefinic cross-linking agent are at an elevated temperature thereby facilitating solution and mixing. To prevent premature polymerization at this stage, a polymerization inhibitor is advantageously added to the mixture, or preferably to one of its components prior to mixing, especially if the mixture is to be stored or shipped in commerce prior to curing. Alternatively, or in addition to including a polymerization inhibitor, a catalyst and/or promoter for the copolymerization may be added, particularly if it is desired to make available in commerce a composition which is ready for polymerization and does not require further chemical additions in order to be used, as is commonly known in the art.

The polymerization inhibitors generally are added in the order of 0.001 to 1 weight percent of the mixture. Among the inhibitors which may advantageously be employed to prevent the premature polymerization of the mixture of polymerizable polyester and olefinic cross-linking agents, particularly if the mixture is to be stored or shipped in commerce prior to curing, are substances such as hydroquinone, benzoquinone, para-tertiarybutyl catechol, para-phenylene diamine, trinitrobenzene, picric acid, and the like.

The proportion of olefinic cross-linking agent to unsaturated polyester can be varied within the ultimate limits of each without departing from the scope of the invention, necessary to produce an infusible, insoluble, polyester resin. In general, the concentration of the unsaturated polyester in the olefinic cross-linking agent can vary between about ten and ninety percent and preferably will vary between about 25 and 75 percent. Polymerization catalysts are preferably added to the mixture of unsaturated polyester and olefinic cross-linking agent to effect setting or curing. Catalysts such as benzoyl peroxide, acetyl peroxide, lauryl peroxide, methylethyl ketone peroxide, cumene hydroperoxide and the like are satisfactory. Such catalysts are used in proportions of 0.01 to ten percent of the total resin, depending on the efficiency of their action and whether or not substances which inhibit polymerization are present in the mixture. The polymerization reaction can also be hastened by adding promoters such as metals or metal salts, cobalt resinates, cobalt maleate, cobalt naphthenate and the like, or amines such dibutylamine, or mercaptans such as dodecyl mercaptan. These are used in proportions similar to or smaller than that stated for the catalysts.

The Additive Mixture

The additive mixture which is incorporated in the unsaturated polyester resin in accordance with this invention comprises iron or a compound of iron and at least one member of the group consisting of copper, a compound of copper, antimony and a compound of antimony in a total amount of about 0.2 to about 15 weight percent and preferably within the range of about 0.5 to about 5 weight percent based on the weight of the unsaturated polyester and copolymerizable unsaturated monomer. The foregoing broad and preferred ranges are about 0.22 to about 150 weight percent, and about 0.56 to about 50 weight percent, respectively, when the range is based on the weight of the unsaturated polyester. The components of the additive mixture may vary within the total amount. The proportion of iron or iron compound is at least about 0.1 and the proportion of copper, or compound of copper and/or antimony is at least about 0.1 (these proportions being each about 0.11 weight percent when based on the weight of the unsaturated polyester). Preferably the components of the additive mixture are present in a ratio based on 100 parts of additive mixture of from about 20 to 80 parts of an iron compound to about 80 to 20 parts of at least one member of the group consisting of a compound of copper and a compound of antimony. As especially preferred composition, based on 100 parts of additive mixture, comprises about 30 to about 40 parts each of a compound of iron, a compound of copper and a compound of antimony.

The Iron Compounds

In the preparation of translucent polyester laminates and other products of the invention, iron salts that permit the transmission of light when incorporated in the cured polyester are preferred. Suitable iron salts are the colorless iron salts such as ferric sulfate hydrates. Other suitable salts which permit light transmission in the cured polyester include ferrous hydroxide, ferrous sulfate, ferrous tartrate, ferrous stannate, ferrous chloride, ferrous ammonium sulfate, and the like.

Other substantially insoluble iron compounds that can be used in accordance with the invention include ferric acetate, ferric formate, ferric borate, ferric tungstate, ferric vandate, ferric molybdate, ferrous tungstate, ferric oxalate, ferric ferrocyanide, ferric chlorendate, and ferric hexachloronorbornene carboxylate.

Especially useful in the compositions of the invention are the iron oxides, such as $Fe_2O_3$, $Fe_3O_4$ and FeO. In this specification including the examples thereof and in the claims the formula $Fe_2O_3$ is used to characterize ferric oxide, in its various polymorphic forms and hydrates, e.g., yellow iron oxide and red iron oxide.

The iron compounds named hereinabove are substantially insoluble in the polyester when admixed with a copolymerizable unsaturated monomer. Also useful are iron compounds that are soluble in the admixture of polyester and copolymerizable unsaturated monomer. Soluble iron compounds which are free of iron-to-carbon bonds are preferred. Useful soluble iron compounds include the metal or metalloxy betaketoenolates of the formula:

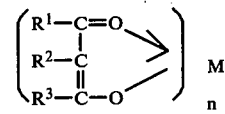

in which M is an iron ion, an ironoxy ion, or an iron hydroxy ion, in which n is an integer equal to the valence of the iron, ironoxy ion or iron hydroxy ion, in which each of $R^1$ and $R^3$ is a substituent selected from the group consisting of hydrogen and an organic substituent selected from alkyl, aryl, cycloalkyl, aralkyl, alkaryl, alkoxy, and aryloxy having one to eight carbon atoms and wherein each aryl substituent is carbocyclic, and in which $R^2$ is selected from the group consisting of $R^1$, $R^3$, halogen, nitro, and sulfo. Typical beta-ketoenolates are the ferrous or ferric acetylacetonates.

Other soluble iron compounds include the iron carboxylates, particularly derivatives of carboxylic acids for example of about 3 to 22 carbon atoms. Illustrative iron carboxylates are iron acrylate, iron oleate, iron naphthenate, iron stearate, iron laurate, iron linoleate, and the like.

The Copper Compounds

In the preparation of translucent polyester laminates and other products of the invention, copper salts that permit the transmission of light when incorporated in the cured polyester are employed. Suitable copper salts are the colorless copper salts such as anhydrous copper sulfate and copper cyanide. Other suitable salts which permit light transmission in the cured polyester include cupric chloride, cupric bromide, copper chloride dihydrate, copper sulfate pentahydrate, copper hydroxide chloride (paratacamite), basic copper chloride (atacamite), copper oxychloride (a mixture of paratacamite and atacamite), copper carbonate, copper borate, and the like. The copper compounds named hereinabove are substantially insoluble in the polyester when admixed with a copolymerizable unsaturated monomer.

Other substantially insoluble copper compounds that can be used in accordance with the invention include copper chlorendate, copper tungstate, copper molybdate, copper tetrafluoroborate, copper thiocyanate, copper chromate, cupric formate, cupric gluconate, cupric oxalate, copper phthalocyanine, cupric tartrate, and the like.

Especially useful in the compositions of the invention are the copper oxides, such as cuprous and cupric oxides.

Other copper compounds are cupric ethylacetoacetate, copper glycinate, cupric hexafluoroacetylacetonate, cupric hydroxyacetate, cupric lactate, cupric naphthenate, cupric octoate, cupric propionate, cupric stearate, cupric acetylacetonate, cupric butyrate, cupric isobutyrate, cupric citrate, cupric cyclohexanebutyrate, cupric dimethyl dithiocarbamate, cupric trifluoroacetylacetonate and cupric undecylenate.

The Antimony Compounds

The antimony constituent of the additive mixture is preferably antimony tri-oxide. However a wide variety of other antimony compounds may be employed, including the tetra-oxide, penta-oxide, and various other inorganic compounds of antimony as well as the various organic compounds of antimony. Inorganic compounds include, for example, the antimony oxides, antimony sulfides, antimony tribromide, antimony trichloride, antimony tetrachloride, antimony triflouride, antimony pentaflouride, antimony triiodide, antimony pentaiodide, antimony oxychloride, antimony trisulfate, antimony trisulfide, antimony triselenide, antimony pentasulfide, antimony tritelluride, antimony tetrasulfide, antimony oxysulfide, antimony potassium tartrate, sodium antimonite, potassium antimonate, and the like. Colorless antimony compounds such as antimony trichloride, antimony tribromide, antimony trifluoride, sodium antimonate and the like may be advantageously employed in the preparation of translucent resins. Many organic antimony compounds are suitable such as the antimony salts of organic acids and their pentavalent derivatives, disclosed in U.S. Pat. No. 2,966,528 issued Aug. 15, 1961, entitled "Trivalent Antimony Salts of Organic Acids and Their Pentavalent Derivatives and Methods of Preparing Same". Compounds of this class include antimony butyrate, antimony valerate, antimony caproate, antimony heptalate, antimony caprylate, antimony pelargonate, antimony caprate, antimony cinnamate, antimony anisate, and their pentavalent dihalide derivatives. Likewise there may be employed the esters of antimonous acids and their pentavalent derivatives disclosed in U.S. Pat. No. 2,993,924, issued July 25, 1961, entitled "Esters of Antimonous Acid and Their Pentavalent Derivatives and Methods of Preparing Same", such as tris(n-octyl) antimonite, tris (2-ethylhexyl) antimonite, tribenzyl antimonite, tris $\beta$-chloropropyl) antimonite, tris $\beta$-chloroethyl) antimonite, tris $\beta$-chlorobutyl) antimonite, tris (butyl) antimonite and their pentavalent dihalide derivatives. Other suitable antimony compounds include the antimony esters of polyhydroxy compounds disclosed in U.S. Pat. No. 3,676,476 issued July 11, 1972, entitled "Method For Producing Trivalent and Pentavalent Antimony Esters of Polyhydroxy Compounds". Still other suitable organic antimony compounds are the cyclic antimonites such as trimethylolpropane antimonite, pentaerythritol antimonite, and glycerol antimonite.

Other iron, copper and antimony compounds which have desirable fire retardant properties, but which adversely affect the stability or cure of the polymer compositions can be employed if such compounds are used in an inactive form such as encapsulated or reacted or complexed with another compound. Such compounds include for example, ferric chloride, copper acetylacetonate, cuprous chloride, cupric nitrate, cupric acetate, copper acrylate, copper naphthenate, copper stearate, and antimony sulfate. These compounds can be encapsulated for example, with gelatin or other polymeric materials. Alternatively the compounds can be reacted or complexed with compounds such as nitro compounds or aromatic ethers or amines. An example of a suitable compound of this type is an amine salt of ferric chloride. In some instances, iron, copper or antimony compounds which are normally detrimental to the stability and/or cure of the resin when employed alone, can be employed without such detriment in a relatively smaller amount as a component in the additive mixture.

In addition, the additive mixture may be prepared from compounds, especially minerals, which contain both iron and copper and/or antimony, such as bornite ($5Cu_2S.Fe_2S_3$), or chalcopyrite ($Cu_2S.Fe_2S_3$).

The additive mixture is preferably incorporated into the polyesters in a finely divided form. Preferred are particles passing through a 200 mesh standard seive. Where translucent polyester products are desired, the additive mixture should not contain a sufficient quantity of particles in the size range approximating the wavelength of light, i.e., about 0.1 to 1.0 microns, to cause undesirable light scattering and resultant decrease in translucence. In practice it has been observed that iron compounds pulverized to pass completely through a 325 mesh screen contain sufficient fine particles to reduce the translucency of the polyester.

The compositions of this invention are essentially phosphorus-free, i.e., exclude phosphorus and compounds of phosphorus. Although the reason is not fully understood, it has been found that phosphorus tends to reduce or degrade the advantageous fire retardant properties achieved in the compositions of this invention.

The Curing Process

The polymerization conditions for effecting the cross-linking reaction between the unsaturated polyesters of this invention and the olefinic cross-linking agent may be selected from a wide variety of techniques but usually involve the application of heat or light. Although pressure is not a required condition for effecting polymerization of the polymerizable mixtures embraced within this invention, it is sometimes advantageously employed, particularly when it is desired to make laminates in preformed shape. The pressures found satisfactory for this purpose are relatively low compared to those required for molding or laminating other type resins than involved herein and may be of the order of that obtained by pressing glass plates having a fiber glass mat or laminate impregnated with the polyester resin sandwiched therebetween.

The temperature at which polymerization is effected depends on a variety of factors, particularly the boiling point of the olefinic cross-linking agent and the exothermic characteristics of the polymerization mixture. A temperature is selected which will give a suitable reaction rate and yet not cause substantial volatilization, and in the case of producing very thick castings, which will not produce a product which is crack-crazed.

The properties of the compositions of this invention can be varied substantially by incorporating modifying agents before, during or after any of the processing steps employed. For example, instead of producing articles of commerce from the compositions of this invention which are in the form of castings or laminates as previously described herein, a foamed type article may be made by incorporating a small percentage of a foaming agent such as sodium bicarbonate into the solution of unsaturated polyester dissolved in mono-olefin and thereafter effecting the copolymerization in the presence of catalyst and heat to produce the foamed article. Formulations which are useful for making moldings embodying the compositions of this invention may be made by mixing into the unsaturated linear polyester and olefinic cross-linking agent mixture, an inert filler such as chopped fiber glass rovings, macerated fabric, asbestos fibers, mica, etc., which serve as fibrous reinforcing media and incorporating a small percentage of a mold lubricant, catalyst and/or promoter. Auxiliary fire retardant additives such as hydrated alumina can be used to add to the fire retardance provided by the halogen and additive mixture of iron, and copper and/or antimony.

It is understood that dyes, pigments, plasticizers, lubricants and various other modifying agents are contemplated as being incorporated in certain formulations to produce compositions embraced in this invention in order to obtain or acentuate any given property.

The following examples are presented to illustrate this invention. Examples 1 through 6 describe the preparation of typical resins which may be used in accordance with the invention. Example 7 and those that follow describe the preparation and testing of fire retardant resins of this invention. It is to be understood that the examples are not to be construed as limiting the invention. In the examples and elsewhere in this specification and claims, all temperatures are in degrees Celsius and all parts and percentages are by weight unless otherwise indicated.

Preparation of Polyesters

EXAMPLE 1

(Resin I)

1A An unpolymerized unsaturated polyester resin was prepared by esterifying about 157 parts of ethylene glycol and 38 parts of diethylene glycol with about 668 parts of 1,4,5,6,7,7-hexachlorobicyclo-(2.2.1)-5-heptene-2,3-dicarboxylic acid and about 136 parts of fumaric acid.

1B The additive mixture comprising iron or a compound of iron, and at least one member of the group consisting of copper, a compound of copper, antimony and a compound of antimony, in proportions described hereinabove, may be admixed with the unsaturated polyester resin prepared as described in Example 1A. The resultant mixture containing the fire retardant additive mixture provides a pre-formulated unsaturated polyester resin which may be readily stored and/or shipped and subsequently further polymerized by reaction with an unsaturated monomer to form a fire retardant polymeric product.

EXAMPLE 2

(Resin II)

About 30 parts of styrene and about 70 parts of product produced by the esterification reaction of Example 1A were mixed together until complete solution was obtained to give a clear, substantially colorless solution of liquid polyester resin having a viscosity of about 30 poises at 25 degrees Celsuis on a Gardner bubble viscometer and having a chlorine content of about 30 percent by weight of the total.

EXAMPLE 3

(Resin III)

An unpolymerized liquid unsaturated polyester resin was prepared by esterifying about 76 parts of propylene glycol with 128 parts of 1,4,5,6,7,7-hexachlorobycyclo-(2.2.1)-5-heptene-2,3-dicarboxylic acid and about 76 parts of maleic anhydride. About 28 parts of styrene and about 55 parts of product produced by the esterification reaction were mixed together until complete solution was obtained to give a clear, substantially colorless solution of liquid polyester resin having a chlorine content of about 19 percent by weight of the total.

EXAMPLE 4

(Resin IV)

An unpolymerized liquid unsaturated polyester resin was prepared by esterifying about 397 parts of ethylene glycol with about 232 parts of fumaric acid and about 1258 parts of tetrachlorophthalic anhydride to provide a polyester of acid member 28 mg. KOH per gram. About 720 parts of styrene were mixed with 1674 parts of the esterification product until complete solution was obtained to give a clear substantially colorless solution of liquid polyester having a chlorine content of about 26 percent.

EXAMPLE 5

(Resin V)

An unpolymerized liquid unsaturated polyester resin was prepared by esterifying about 19 parts of diethylene glycol and about 140 parts of ethylene glycol with 118 parts of maleic anhydride, 57 parts of phthalic anhydride, 375 parts of tetrabromophthalic anhydride and 3 parts of sodium acetate. About 271 parts of styrene and 0.1 part of hydroquinone were mixed with polyester until complete solution was obtained to give a clear, substantially colorless solution of liquid polyester having a viscosity of about 4 poises at 25 degrees Celsius on a Gardner bubble viscometer and having a bromine content of about 26 percent.

EXAMPLE 6

(Resin VI)

An unpolymerized liquid unsaturated polyester resin was prepared by esterifying about 157 parts of ethylene glycol and 38 parts of diethylene glycol with about 668 parts of 1,4,5,6,7,7-hexachlorobicyclo-(2.2.1)-5-heptene-2,3-dicarboxylic acid and about 136 parts of fumaric acid. About 70 parts of this unsaturated resin and about 30 parts of vinyl toluene were mixed together until complete solution was obtained to give a clear, substantially colorless solution of liquid polyester resin having a chlorine content of about 29 percent by weight of the total.

The following examples show the results of fire retardance tests by the ASTM D-757-65 and ASTM-2843-70 test methods on castings of the resins prepared as described in Examples 1 through 6 (Resins I through VI, respectively). The castings were prepared by mixing 100 parts by weight of resin solution with the additive mixture of an iron compound and an antimony compound and/or a copper compound in the amount indicated in the tables, 0.2 part of 12 percent cobalt octoate, and such other additives as are indicated in the tables. After at least 10 minutes stirring to assure uniform dispersion of the immiscible materials, the catalyst, methyl ethyl ketone peroxide (60% in dimethyl phthalate), 1 part was added, stirred for 1 to 2 minutes, and then the mixture was allowed to cure at 25 degrees Celsius for 16 hours and at 65 degrees Celsius for 8 hours. The castings were then removed from the mold, cut into specimen bars for testing by ASTM D-757-65 test method, for smoke by ASTM D-2843-70, and for heat deflection temperature (identified in the tables as "HDT"), by ASTM D-648-72 test method. Dataon light absorption due to smoke obscuration was acquired by a computer which printed out the light absorption and percent smoke at one second intervals. The "Smoke Density Rating" of this modification of the ASTM test is the cumulative percent smoke at 60 seconds. Samples which were used for the ASTM D-2843-70 test measured 0.5 inch × 0.5 inch × 0.125 inch.

In the examples the weight percent of additives is based on the weight of the resin. Thus, for example, 1.0 weight percent of an additive compound or mixture indicates one part by weight of the compound or mixture per one hundred parts by weight of the resin.

Tables I and II (Examples 7 through 23) set forth the results of fire retardance tests demonstrating the interaction of various iron, copper and antimony compounds as additive mixtures at a level of about 1.0 weight percent in the resin of Example II.

TABLE I

| | Interactions of Iron, Copper and Antimony Compounds in Resin II | | | | | | |
|---|---|---|---|---|---|---|---|
| | Weight Percent | | | ASTM D-757-65 | | ASTM-2843 | |
| Example No. | $Sb_2O_3$ | $Fe_2O_3$ | CuO | Burn Rate (in/min) | Flameout Time (secs) | Smoke Density Rating (%) | Char (%) |
| 7C* | 0 | 0 | 0 | 0.25 | 140–170 | 63 | 16 |
| 8C | 0 | 0 | 1.0 | 0.10 | 0–0 | 51 | 27 |
| 9C | 0 | 1.0 | 0 | 0.05 | 0–0 | 37 | 43 |
| 10C | 1.0 | 0 | 0 | 0.08 | 140–145 | 52 | 31 |
| 11 | 0.5 | 0.5 | 0 | 0.04 | 0–0 | 33 | 45 |
| 12 | 0.7 | 0.3 | 0 | 0.08 | 0–45 | 28 | 43 |
| 13 | 0.3 | 0.7 | 0 | 0.07 | 0–60 | 33 | 43 |
| 14 | 0 | 0.5 | 0.5 | 0.06 | 0–0 | 34 | 39 |
| 15 | 0.3 | 0.3 | 0.4 | 0.06 | 0–0 | 26 | 48 |

*In this and in succeeding examples the letter "C" indicates a control example.

The data of Table I demonstrates that at the 1% level the presence of the metal compound additives results in substantial improvements in all aspects of fire retardance when compared to the polyester resin alone. Furthermore, the combination of additives (Examples 11–15), in each instance, resulted in substantial lowering of percent smoke in comparison with an equal amount of the iron, copper or antimony compound alone (Control Examples 8–10), the benefits being greater than additive. In addition, beneficial formation of char was increased to an extent greater than additive. Example 15 illustrates a preferred embodiment of this invention, wherein approximately equal parts of $Sb_2O_3$, $Fe_2O_3$ and CuO are employed as the additive mixture.

TABLE II

| | Interaction of Antimony, Ferric and Cupric Compounds at 1% Level in Resin II | | | | | |
|---|---|---|---|---|---|---|
| | Weight Percent | | | ASTM D-757-65 | | ASTM-2843 |
| Example No. | $Sb_2O_3$ | $Fe_2(SO_4)_3$ | $CuSO_4$ | BUrn Rate (in/min) | Flameout Time (Secs.) | Smoke Density Rating (%) |
| 16C | 1.0 | 0 | 0 | 0.09 | 165 | 61 |
| 17C | 0 | 0 | 1.0 | 0.14 | 90 | 69 |
| 18C | 0 | 1.0 | 0 | 0.13 | 108 | 70 |
| 19 | 0.4 | 0.3 | 0.3 | 0.12 | 117 | 61 |
| 20 | 0.2 | 0.4 | 0.4 | 0.12 | 62 | 54 |
| 21 | 0 | 0.5 | 0.5 | 0.12 | 75 | 59 |
| 22 | 0.5 | 0.5 | 0 | 0.1 | 160 | 53 |
| 23 | 0.6 | 0.2 | 0.2 | 0.11 | 72 | 53 |

Examples 19 through 23 demonstrate the preparation of translucent fire retardant resins. Good translucency is achieved through the use of an additive mixture comprising iron and copper sulfates with or without a small amount of antimony. It will be noted that although additive mixtures containing these compounds are somewhat less effective than those based on iron and copper oxides, the additive mixtures of Examples 19-23 are at least as effective in this respect as the known antimony oxide fire retardant of Example 16C and provide the additional advantage of translucency.

Tables III through VI (Examples 24 through 82) set forth the results of fire retardance tests demonstrating the interaction of various iron, copper, and antimony compounds as additive mixtures at levels of from about 1% to 5% in the resin of Example II.

TABLE III

Interactions of Iron and Antimony Compounds in Resin II

| Example No. | Compound | Weight Percent | Weight Percent of Sb$_2$O$_3$ | HDT | ASTM-D-757-65 Burn Rate (in/min.) | ASTM-D-757-65 Flameout Time (secs) | ASTM-2843 Smoke Density Rating (%) | Char (%) |
|---|---|---|---|---|---|---|---|---|
| 24C | — | — | — | 80 | .261 | 162 | 62 | 17 |
| 25C | Fe$_2$O$_3$ | 1.0 | — | 79 | .053 | 0 | 37 | 43 |
| 26C | Fe$_2$(SO$_4$)$_3$ | 1.0 | — | 79 | .198 | 142 | 57 | 24 |
| 27C | — | — | 1.0 | 86 | .083 | 145 | 52 | 31 |
| 28 | Fe$_2$O$_3$ | 0.5 | 0.5 | 81.5 | .042 | 0 | 33 | 45 |
| 29 | " | 0.3 | 0.7 | 81 | .078 | 0–45 | 27 | 43 |
| 30 | " | 0.7 | 0.3 | 80 | .073 | 0–60 | 33 | 42 |
| 31 | Fe$_2$(SO$_4$)$_3$ | 0.5 | 0.5 | 89 | .104 | 180 | 48 | 32 |
| 32 | " | 0.7 | 0.3 | 83 | .125 | 0–130 | 50 | 28 |
| 33 | " | 0.8 | 0.2 | 83 | .136 | 95 | 49 | 26 |

*C indicates a control example.

It will be apparent from the data of Table III and elsewhere in this specification that some variation will occur in the fire retardant properties of the compositions depending on the specific compounds employed in the additive mixture and the particular resin employed. For example, the data of Table III indicates that in the specific resin employed, additive mixtures containing Fe$_2$(SO$_4$)$_3$ (Examples 31–33) are not as effective, in general, as those containing Fe$_2$O$_3$ (Examples 28–30). Nevertheless, it will also be apparent that in each instance a substantial improvement in fire retardant properties is achieved when the additive mixture is employed, in comparison with the fire retardant properties of the resin (Example 24) containing no additive mixture. Furthermore, it will also be apparent from the data that the combination of an iron compound and an antimony compound provides fire retardant properties equal to or improved over compositions containing either one alone, with an economic advantage resulting from the use of an iron compound in partial substitution for the more expensive antimony compound.

TABLE IV

Interactions of Iron, Copper and Antimony Compounds at 1 percent level in Resin II

| Example No. | Weight Percent Fe$_2$O$_3$ | Weight Percent Sb$_2$O$_3$ | Weight Percent CuO | ASTM-D-757-65 Burn Rate (in/min.) | ASTM-D-757-65 Flameout Time (secs) | ASTM-2843 Smoke Density Rating (%) |
|---|---|---|---|---|---|---|
| 34C | — | — | — | .261 | 162 | 62 |
| 35C | — | 1.0 | — | .115 | 173 | 54 |
| 36C | 1.0 | — | — | .177 | 57 | 41 |
| 37C | — | — | 1.0 | 0.94 | 0 | 50 |
| 38 | 0.4 | 0.2 | 0.4 | .074 | 0 | 34 |
| 39 | 0.2 | 0.2 | 0.6 | .083 | 0 | 34 |
| 40 | 0.6 | 0.2 | 0.2 | 0.184 | 56 | 35 |
| 41 | 0.1 | 0.2 | 0.7 | .094 | 0 | 37 |
| 42 | 0.7 | 0.2 | 0.1 | 0.16 | 57 | 30 |
| 43 | 0.25 | 0.50 | 0.25 | .063 | 0 | 38 |
| 44 | 0.2 | 0.5 | 0.3 | .074 | 0 | 42 |
| 45 | 0.3 | 0.5 | 0.2 | .094 | 0 | 31 |
| 46 | 0.4 | 0.5 | 0.1 | .091 | 10 | 30 |
| 47 | 0.1 | 0.5 | 0.4 | .074 | 0 | 26 |
| 48 | 0.3 | 0.4 | 0.3 | .083 | 0 | 44 |
| 49 | 0.2 | 0.4 | 0.4 | .074 | 0 | 29 |
| 50 | 0.4 | 0.4 | 0.2 | .094 | 23 | 28 |
| 51 | 0.3 | 0.3 | 0.4 | .063 | 0 | 26 |

TABLE V

Interactions of Iron, Copper and Antimony Compounds at 2% level in Resin II

| Example No. | Weight Percent Fe$_2$O$_3$ | Weight Percent Sb$_2$O$_3$ | Weight Percent CuO | ASTM-D-757-65 Burn Rate (in/min) | ASTM-D-757-65 Flameout Time (secs) | ASTM-2843 Smoke Density Rating (%) |
|---|---|---|---|---|---|---|
| 52C | 2.0 | — | — | 0.166 | 90 | 28 |
| 53C | — | 2.0 | — | 0.094 | 105 | 47 |
| 54C | — | — | 2.0 | 0.094 | 0 | 51 |
| 55 | 1.60 | — | 0.40 | 0.146 | 7 | 33 |
| 56 | 1.0 | — | 1.0 | 0.083 | 0 | 34 |
| 57 | 0.4 | — | 1.6 | 0.074 | 0 | 36 |
| 58 | — | 0.4 | 1.6 | 0.094 | 0 | 47 |
| 59 | — | 1.0 | 1.0 | 0.104 | 0 | 39 |
| 60 | — | 1.6 | 0.4 | 0.094 | 0 | 50 |
| 61 | 1.6 | 0.4 | — | 0.063 | 0 | 33 |
| 62 | 1.0 | 1.0 | — | 0.063 | 0 | 28 |
| 63 | 0.4 | 1.6 | — | 0.074 | 0 | 26 |

TABLE VI

Interactions of Iron, Copper and Antimony Compounds at 5% Level in Resin II

| Example No. | Weight Percent Fe₂O₃ | Weight Percent Sb₂O₃ | Weight Percent CuO | ASTM-D-757-65 Burn Rate (in/min) | ASTM-D-757-65 Flameout Time (secs) | ASTM-2843 Smoke Density Rating (%) |
|---|---|---|---|---|---|---|
| 64C | 5.0 | — | — | 0.125 | 45 | 26 |
| 65C | — | 5.0 | — | 0.083 | 0 | 38 |
| 66C | — | — | 5.0 | 0.104 | 0 | 44 |
| 67 | 2.0 | 1.0 | 2.0 | 0.074 | 0 | 26 |
| 68 | 1.0 | 1.0 | 3.0 | 0.074 | 0 | 28 |
| 69 | 3.0 | 1.0 | 1.0 | 0.074 | 0 | 26 |
| 70 | 0.5 | 1.0 | 3.5 | 0.074 | 0 | 27 |
| 71 | 3.5 | 1.0 | 0.5 | 0.063 | 0 | 25 |
| 72 | 1.5 | 2.0 | 1.5 | 0.074 | 0 | 26 |
| 73 | 1.0 | 2.0 | 2.0 | 0.063 | 0 | 25 |
| 74 | 2.0 | 2.0 | 1.0 | 0.063 | 0 | 25 |
| 75 | 1.25 | 2.50 | 1.25 | 0.063 | 0 | 25 |
| 76 | 1.0 | 2.50 | 1.50 | 0.063 | 0 | 25 |
| 77 | 1.5 | 2.5 | 1.0 | 0.063 | 0 | 23 |
| 78 | 2.0 | 2.5 | 0.50 | 0.063 | 0 | 21 |
| 79 | 0.5 | 2.5 | 2.0 | 0.074 | 0 | 25 |
| 80 | 0.5 | 3.5 | 1.0 | 0.074 | 0 | 21 |
| 81 | 1.0 | 3.5 | 0.5 | 0.074 | 0 | 21 |
| 82 | 1.0 | 3.0 | 1.0 | 0.063 | 0 | 18 |

Tables VII through X provide data demonstrating the fire retardant properties achieved when additive mixtures of iron and copper and/or antimony compounds are incorporated in resins III through VI.

TABLE VII

Additive Mixture of Iron and Antimony Compounds in Resin III

| Ex. No. | Weight Percent Sb₂O₃ | Weight Percent Fe₂O₃ | ASTM-D-757-65 Burn Rate (in/min) | ASTM-D-757-65 Flameout Time (secs) | ASTM-2843 Smoke Density (%) |
|---|---|---|---|---|---|
| 83C | — | 1.0 | .41 | 180 | 23 |
| 84C | 1.0 | — | .29 | 172 | 57 |
| 85 | 0.5 | 0.5 | .21 | 152 | 54 |

TABLE VIII

Additive Mixture of Iron and Copper Compounds in Resin IV

| Example No. | Weight Percent CuSO₄·5H₂O | Weight Percent Fe₂(SO₄)₃·XH₂O | ASTM-D-757-65 Burn Rate (in/min) | ASTM-D-757-65 Flameout Time (secs) | ASTM-2843 Smoke Density Rating (%) |
|---|---|---|---|---|---|
| 86C | 1.0 | — | 0.39 | 180 | 71 |
| 87C | — | 1.0 | 0.31 | 150 | 70 |
| 88* | 0.5 | 0.5 | 0.34 | 145 | 65 |

*The cast resin of this example is translucent

TABLE IX

Additive Mixtures of Iron, Copper and Antimony Compounds in Resin V

| Example No. | Weight Percent Sb₂O₃ | Weight Percent Fe₂O₃ | Weight Percent CuO | ASTM-D-757-65 Burn Rate (in/min) | ASTM-D-757-65 Flameout Time (secs) | ASTM-2843 Smoke Density (%) |
|---|---|---|---|---|---|---|
| 89C | 1.0 | — | — | .16 | 10 | 80 |
| 90C | — | 1.0 | — | .29 | 95 | 81 |
| 91C | — | — | 1.0 | .32 | 92 | 75 |
| 92C | — | — | — | .29 | 136 | 76 |
| 93 | — | 0.5 | 0.5 | .17 | 0 | 72 |
| 94 | 0.5 | 0.5 | — | .16 | 0 | 80 |
| 95 | 0.35 | 0.35 | 0.30 | .17 | 0 | 81 |

TABLE X

Interactions of Iron, Copper and Antimony Compounds in Resin VI

| Example No. | Weight Percent Sb₂O₃ | Weight Percent CuO | Weight Percent Fe₂O₃ | ASTM-D-757-65 Burn Rate (in/min) | ASTM-D-757-65 Flameout Time (secs) | ASTM-2843 Smoke Density (%) | Char (%) |
|---|---|---|---|---|---|---|---|
| 96C | — | — | — | .313 | 175 | 60 | 24 |
| 97C | 1.0 | — | — | .188 | 115 | 61 | 23 |
| 98C | 3.0 | — | — | .166 | 140 | 60 | 25 |
| 99C | — | — | 1.0 | .208 | 120 | 55 | 31 |
| 100C | — | 1.0 | — | .197 | 55 | 62 | 25 |
| 101 | — | 0.5 | 0.5 | .161 | 40 | 50 | 30 |
| 102 | 0.3 | 0.4 | 0.3 | .104 | 0 | 45 | 29 |

TABLE XI

Interaction of Iron and Antimony Compounds in Resin II

| Example No. | Iron Compound | | Antimony Compound | | AST D-757-65 | | ASTM-2843 |
|---|---|---|---|---|---|---|---|
| | Compound | Weight Percent | Compound | Weight Percent | Burn Rate (in/min.) | Flameout Time (secs.) | Smoke Density Rating (%) |
| 103C | | | $Sb_2O_3$ | 2.0 | 0.15 | 163 | 55 |
| 104C | Zn Fe oxalate | 2.0 | | | 0.13 | 110 | 32 |
| 105 | Zn Fe oxalate | 1.0 | $Sb_2O_3$ | 1.0 | 0.09 | 68 | 30 |
| 106C | $Fe_2O_3$ | 2.0 | | | 0.18 | 98 | 14 |
| 107C | | | SbOCl | 2.0 | 0.16 | 120 | 38 |
| 108 | $Fe_2O_3$ | 1.0 | SbOCl | 1.0 | 0.09 | 35 | 21 |
| 109C | Fe metal | 2.0 | | | 0.30 | 170 | 39 |
| 110 | Fe metal | 1.0 | $Sb_2O_3$ | 1.0 | 0.13 | 40 | 28 |
| 111C | | | $Sb_2(SO_4)_3$ | 2.0 | (Additive prevented cure of polymer) | | |
| 112 | $Fe_2O_3$ | 1.0 | $Sb_2(SO_4)_3$ | 1.0 | 0.14 | 55 | 37 |
| 113C | FeOCl* | 2.0 | | | (Additive prevented cure of polymer) | | |
| 114 | FeOCl* | 1.0 | $Sb_2O_3$ | 1.0 | 0.09 | 0 | 40 |
| 115C | $FeF_3 \cdot 3H_2O$ | 2.0 | | | 0.09 | 50 | 23 |
| 116 | $FeF_3 \cdot 3H_2O$ | 1.0 | $Sb_2O_3$ | 1.0 | 0.10 | 70 | 24 |
| 117C | $FeSiF_6$ | 2.0 | | | 0.06 | 163 | 34 |
| 118 | $FeSiF_6$ | 1.0 | $Sb_2O_3$ | 1.0 | 0.08 | 135 | 37 |
| 119C | ferrocenes** | 1.0 | | | 0.18 | 107 | 35 |
| 120 | ferrocenes** | 0.5 | $Sb_2O_3$ | 0.5 | 0.08 | 0 | 16 |

*Contained some $FeCl_3$
**A mixture of acetyl ferrocene and diacetyl ferrocenes

EXAMPLE 121

(Resin VII)

A post-brominated polyester was prepared in substantial accord with the procedure of U.S. Pat. No. 3,536,782 by esterifying about 361.6 parts of ethylene glycol with 424.5 parts of tetrahydrophthalic anhydride and 237.58 parts of maleic anhydride in the presence of 0.053 parts of tolylhydroquinone polymerization inhibitor under an inert atmosphere of nitrogen gas, recovering the resultant polyester and subjecting 458.75 parts of the polyester product to halogenation with 208.75 parts of molecular bromine in the presence of 668 parts methylene chloride reaction solvent to obtain a post-halogenated polyester which was the brominated product of the ester of ethylene glycol with tetrahydrophthalic anhydride and maleic anhydride. The post-brominated polyester was then mixed with styrene substantially in accordance with the procedure of Example 2 to provide a polyester-styrene mixture containing about 70% post-brominated polyester and 30% styrene.

EXAMPLE 122

Castings of Resin VII were prepared by a procedure substantially in accord with the method employed in Examples 7 to 23 above (employing about 130 parts of the styrene-post-brominated polyester mixture of Example 121 for each casting) except that 0.8 parts of volume of the solution of methyl ethyl ketone peroxide in dimethyl phthalate together with 0.18 parts by volume of liquid cobalt octoate (Cobalt Ten Chem manufactured by Mooney Chemicals Inc. containing 12% cobalt octoate) were used in preparing each casting, casting ID having a mixture of one weight percent of yellow iron oxide and one weight percent of antimony trioxide as fire retardant additive mixture according to the invention, casting IB being a comparative casting having 2 weight percent yellow iron oxide as fire retardant, casting IC being a comparative casting having 2 weight percent of antimony trioxide as fire retardant, and casting IA being a control withour an inorganic fire retardant additive. The castings were cut into speciment bars and tested for heat distortion temperature properties by the ASTM D-648-72 testing method, for burn rate and flame out time by the ASTM D-757-65 test method and for smoke density by the ASTM D-2843-70 Test method substantially as described in the procedure given for the foregoing Examples. The results of these tests are set forth in Table XII below. The excellent exceedingly low flame out time of the yellow iron oxide-antimony trioxide containing casting compared to the corresponding property of the control casting, the yellow iron oxide-containing casting, and the antimony trioxide-containing casting illustrates the synergism of the additive mixture as fire retardant in the styrene-post-brominated polyester resin according to the invention.

TABLE XII

Fire Retardant Synergism of Iron Compound with Resin VI

| Casting No. | Compound | Weight Percent | HDT | ASTM D-757-65 | | Smoke Density Rating, % |
|---|---|---|---|---|---|---|
| | | | | Burn Rate (in/min) | Flameout Time (secs) | |
| 1A | none | — | 78 | 0.44 | 180 | 82 |
| 1B | iron oxide, yellow | 2 | 77 | 0.27 | 147 | 81 |
| 1C | antimony oxide | 2 | 76.5 | 0.21 | 149 | 81 |
| 1D | iron oxide, yellow and antimony oxide | 2 (1% iron oxide, 1% antimony oxide) | 76 | 0.24* | 3 | 83 |

*In consideration of the three second flame out time, indicating almost no period of burning, the burn rate in this example is essentially a charring rate.

The foregoing specification is intended to illustrate the invention with certain preferred embodiments, but it

We claim:

1. In a copolymerizable mixture of an unsaturated polyester composition and a copolymerizable ethylenically unsaturated monomer capable of copolymerization to form a fire retardant polymer composition, said unsaturated polyester composition comprising a halogenated α, β-ethylenically unsaturated polyester of a polycarboxylic compound and a polyhydric alcohol, which contains halogen in a proportion of about 4 up to about 50 weight percent, the improvement wherein said mixture contains an effective fire retardant proportion of about 0.2 to about 15 weight percent of an additive mixture consisting essentially of at least 0.1 weight percent of iron or an iron compound in combination with at least 0.1 weight percent of at least one member of the group consisting of antimony, an antimony compound, copper, a copper compound, and mixtures thereof; said composition being substantially phosphorus-free and said proportions being based on the weight of the copolymerizable mixture.

2. The composition of claim 1 wherein the halogen is present in the polycarboxylic compound of the unsaturated polyester.

3. The composition of claim 2 wherein the halogen is chlorine.

4. The composition of claim 3 wherein the polycarboxylic compound is chlorendic acid or chlorendic anhydride.

5. The composition of claim 3 wherein the polycarboxylic compound is tetrachlorophthalic acid or tetrachlorophathalic anhydride.

6. The composition of claim 2 wherein the halogen is bromine.

7. The composition of claim 6 wherein the polycarboxylic compound is tetrabromophthalic acid or tetrabromophthalic anhydride.

8. The composition of claim 2 wherein the polyhydric alcohol is a mixture of ethylene glycol and diethylene glycol.

9. The composition of claim 2 wherein the polyhydric alcohol is propylene glycol.

10. The composition of claim 1 wherein the unsaturated monomer is styrene.

11. The composition of claim 1 wherein the unsaturated monomer is vinyl toluene.

12. The composition of claim 1 wherein the additive mixture comprises a compound of iron and a compound of copper.

13. The composition of claim 1 wherein the additive mixture comprises a compound of iron and a compound of antimony.

14. The composition of claim 1 wherein the additive mixture comprises a compound of iron, a compound of copper and a compound of antimony.

15. The composition of claim 14 wherein the additive mixture comprises an oxide of iron, an oxide of copper and an oxide of antimony.

16. The composition of claim 1 comprising about 0.5 to about 5 weight percent of the additive mixture wherein the components of said additive mixture are present in a ratio of from about 20 to 80 parts of an iron compound to from about 80 to 20 parts of at least one member of the group consisting of a compound of copper and a compound of antimony.

17. The composition of claim 16 wherein the additive mixture comprises an oxide of iron and an oxide of copper.

18. The composition of claim 16 wherein the additive mixture comprises an oxide of iron and an oxide of antimony.

19. The composition of claim 15 comprising about 0.5 to about 5 weight percent of the additive mixture wherein the compounds of said additive mixture are present in a ratio of from about 30 to about 40 parts of an oxide of iron; from about 30 to about 40 parts of an oxide of copper; and from about 30 to about 40 parts of an oxide of antimony.

20. The composition of claim 1 wherein the iron or compound of iron is ferric oxide.

21. The composition of claim 1 wherein the iron or compound of iron is ferric sulfate.

22. The composition of claim 12 wherein the compound of copper is cupric oxide.

23. The composition of claim 12 wherein the compound of copper is cupric sulfate.

24. The composition of claim 13 wherein the compound of antimony is antimony oxide.

25. In a fire retardant polymer composition, copolymerizable with an unsaturated monomer, said composition comprising a halogenated α, β-ethylenically unsaturated polyester of a polycarboxylic compound and a polyhydric alcohol, the polyester containing halogen in a proportion of about 4.4 up to about 56 weight percent, the improvement wherein the polyester contains an effective fire retardant proportion of between about 0.22 and about 150 weight percent of an additive mixture consisting essentially of at least 0.11 weight percent of iron or an iron compound in combination with at least 0.11 weight percent of at least one member of the group consisting of antimony, an antimony compound, copper, a copper compound and mixtures thereof; said composition being substantially phosphorus-free and said proportions being based on the weight of unsaturated polyester.

26. The composition of claim 25 wherein the halogen is present in the polycarboxylic compound.

27. The composition of claim 26 wherein the halogen is chlorine.

28. The composition of claim 27 wherein the polycarboxylic compound is chlorendic acid or chlorendic anhydride.

29. The composition of claim 27 wherein the polycarboxylic compound is tetrachlorophthalic acid or tetrachlorophthalic anhydride.

30. The composition of claim 26 wherein the halogen is bromine.

31. The composition of claim 30 wherein the polycarboxylic compound is tetrabromophthalic acid or tetrabromophthalic anhydride.

32. The composition of claim 25 wherein the additive mixture comprises a compound of iron and a compound of copper.

33. The composition of claim 25 wherein the additive mixture comprises a compound of iron and a compound of antimony.

34. The composition of claim 25 wherein the additive mixture comprises a compound of iron, a compound of copper and a compound of antimony.

35. The composition of claim 34 wherein the additive mixture comprises an oxide of iron, an oxide of copper and an oxide of antimony.

36. The composition of claim 25 wherein the additive mixture comprises about 20 to 80 parts of an iron compound and about 80 to 20 parts of at least one member of the group consisting of a compound of copper and a compound of antimony.

37. The composition of claim 36 wherein the additive mixture comprises ferric oxide and cupric oxide.

38. The composition of claim 36 wherein the additive mixture comprises ferric oxide and antimony oxide.

39. The composition of claim 36 wherein the additive mixture comprises about 30 to about 40 parts of ferric oxide; about 30 to about 40 parts of cupric oxide; and about 30 to about 40 parts of antimony oxide.

40. The composition of claim 25 wherein the iron or compound of iron is ferric oxide.

41. The composition of claim 25 wherein the iron or compound of iron is ferric sulfate.

42. The composition of claim 32 wherein the compound of copper is cupric oxide.

43. The composition of claim 32 wherein the compound of copper is cupric sulfate.

44. The composition of claim 33 wherein the compound of antimony is antimony oxide.

45. The composition of claim 1 when copolymerized to an infusible product.

46. In a fire retardant polymer composition comprising a copolymerized reaction product of
(a) an unsaturated polyester of chlorendic acid or anhydride, an unsaturated dicarboxylic acid or anhydride and a polyhydric alcohol, containing chlorine in a proportion of about 15 up to about 50 weight percent; and
(b) an ethylenically unsaturated monomer; the improvement wherein the polymer composition contains a fire retardant proportion of about 0.5 to about 5 weight percent of an additive mixture of metal compounds consisting essentially of at least 0.1 weight percent of an iron compound in combination with at least about 0.1 weight percent of at least one member of the group consisting of a copper compound, an antimony compound and mixtures thereof wherein said compounds permit the transmission of light; said composition being substantially phosphorus-free and said proportions being used on the weight of the copolymerized reaction product.

47. The composition of claim 6 wherein the polyester is a post-brominated polyester.

48. The composition of claim 47 wherein the post-brominated polyester is the brominated product of the ester of ethylene glycol with tetrahydrophthalic anhydride and maleic anhydride.

49. The composition of claim 25 wherein the halogen is bromine.

50. The composition of claim 49 wherein the polyester is a post-brominated polyester.

51. The composition of claim 50 wherein the post-brominated polyester is the brominated product of the ester of ethylene glycol with tetrahydrophthalic anhydride and maleic anhydride.

* * * * *